United States Patent Office 3,236,867
Patented Feb. 22, 1966

---

3,236,867
2-LOWER ALKYL-ANDROSTANE-3,17β-DIOLS AND ESTERS THEREOF
Howard J. Ringold, Shrewsbury, Mass., and George Rosenkranz, Mexico City, Mexico, assignors to Syntex S.A., Mexico City, Mexico, a corporation of Mexico
No Drawing. Filed Dec. 6, 1960, Ser. No. 73,991
Claims priority, application Mexico, Feb. 7, 1956, 43,865; Dec. 17, 1956, 46,584
7 Claims. (Cl. 260—397.4)

This application is a continuation-in-part of our copending application Serial No. 636,860, filed January 29, 1957; Serial No. 702,763 filed December 16, 1957, and Serial No. 819,543 filed June 11, 1959, all now abandoned.

The present invention relates to novel cyclopentanophenanthrene compounds and to process of the preparation thereof.

More particularly the present invention relates to novel 2-lower alkyl and 2-aralkyl-androstane-3,17β-diols and esters thereof which may also contain a lower alkyl group at C–17α and unsaturation at C–4.

The novel compounds of the present invention which are hormones of the androgenic type exhibiting anabolic, anti-estrogenic and anti-gonadotrophic activity are represented by the following formulas:

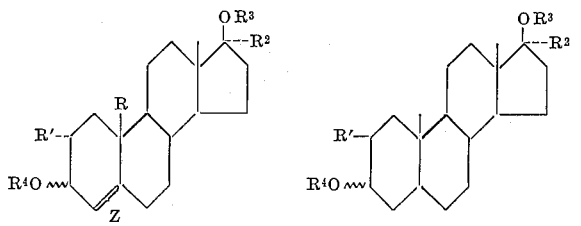

In the above formulas Z indicates a double bond or a saturated linkage between C–4 and C–5, R represents hydrogen or methyl; R² represents hydrogen or lower alkyl, R' represents a lower alkyl group such as methyl, ethyl or propyl or a lower monocyclic aralkyl group such as benzyl; R³ and R⁴ represent hydrogen or an acyl group of a hydrocarbon carboxylic acid of less than 12 carbon atoms, saturated or unsaturated, of straight, branched, cyclic or mixed cyclic-aliphatic chain, substituted or not with methoxy, halogen or other groups. Typical ester groups are the acetate, propionate, butyrate, hemisuccinate, enanthate, caproate, benzoate, trimethylacetate, phenoxyacetate, cyclopentylpropionate, phenylpropionate and β-chloropropionate.

The preparation of the novel 2α-alkyl and 2α-aralkyl derivatives of the present invention can be illustrated by the following equation:

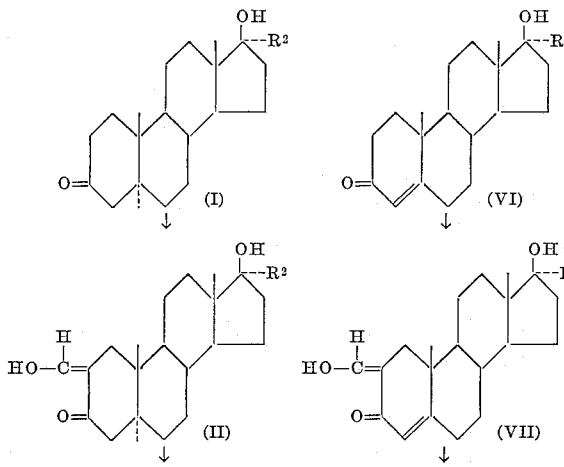

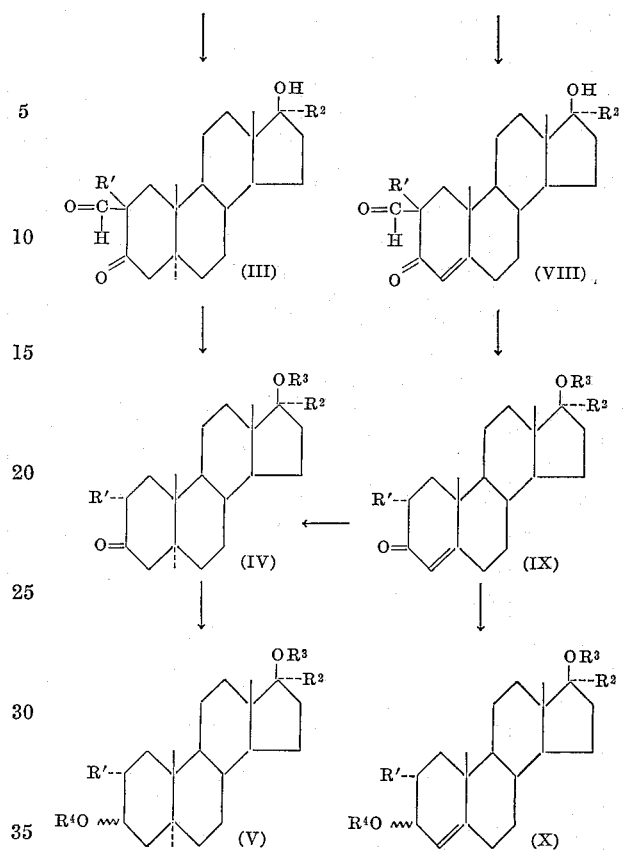

In the above formulas R' through R⁴ have the same meaning as previously set forth.

In practicing the process set forth above, the starting compound which may be testosterone, 17α-lower alkyl testosterone such as 17α-methyl or 17α-ethyl (VI) or the corresponding 4–5 saturated derivative of the allo series i.e. androstan-17β-ol-3-one or 17α-methyl- or 17α-ethylandrostan-17β-ol-3-one (I) is suspended in an inert organic solvent such as anhydrous benzene and is then mixed with ethyl formate and sodium hydride. The reaction mixture is then kept for a long period of time (of the order of one day) at room temperature under a nitrogen atmosphere. The excess of hydride is then decomposed by cautious addition of methanol. Cold water is then added to form two layers with the desired product in the water layer in the form of its sodium salt. The aqueous layer is separated, washed and acidified with dilute mineral acid such as hydrochloric acid and extracted with an organic solvent such as methylene chloride. From the organic solvent solution the desired 2-hydroxymethylene intermediate (VII or II) is obtained as by evaporation to dryness and recrystallization. The 2-hydroxymethylene compounds are treated in an organic solvent suspension with sodium hydride and with an alkyl or aralkyl iodide (preferably a lower alkyl or benzyl iodide) preferably under reflux conditions and under a nitrogen atmosphere. The reaction is continued for a long period of time, of the order of 72 hours, with successive increments of the iodide being added at intervals of 24 hours. The mixture is cooled, washed with dilute base to remove unreacted starting material; the product, namely the 2-alkyl or aralkyl-2'-formyl derivative (VIII or III), is recovered from the organic layer by evaporation and recrystallization.

The 2-alkyl or aralkyl-2'-formyl derivatives thus prepared are then treated with mild base, preferably activated alumina (chromatographic type) of alkaline reaction. This treatment involves passing a benzene solution of the compounds through a column of the alumina and after about a days time, eluting the product from the column with an organic solvent such as ethyl acetate. The products after crystallization are the corresponding 2α-alkyl or aralkyl compounds, i.e. 2α-lower alkyl (such as methyl, ethyl or propyl) or benzyl derivatives of testosterone, 17α-lower alkyl testosterone (IX) or of the saturated compounds such as androstan-17β-ol-3-one or of 17α-lower alkyl-androstan-17β-ol-3-one (IV). According to the above equation, the 2α-alkyl or aralkyl derivatives of testosterone or of the 17α-lower alkyl-testosterones (IX) are hydrogenated in the presence of a hydrogenation catalyst, preferably a palladium catalyst and more specifically palladium on barium sulfate catalyst. After separation of the catalyst, the two isomers (i.e. the testane and androstane derivatives) formed and were separated by chromatography with the androstane derivatives (IV) predominating.

Alternatively the double bond of the 2α-alkyl or aralkyl derivatives of testosterone or of the 17α-lower alkyl testosterones (IX) is saturated by treatment with lithium in liquid ammonia.

For formation of the novel 3-alcohols, the 2α-alkyl or aralkyl derivatives of dihydrotestosterone, testosterone or of the 17α-lower alkyl derivatives thereof (IV or IX) is dissolved in a lower aliphatic alcohol such as methanol and mixed with sodium borohydride. After standing overnight at room temperature, the solvent is removed and the reduction product purified, to give a mixture of the 3α and 3β-hydroxy compounds.

In a similar manner the process outlined above is applied to 19-nor-testosterone or its 17α-lower alkyl derivative. Thus the 19-nor compound is suspended in an inert solvent such as benzene and mixed with ethyl formate and sodium hydride and is maintained under a nitrogen atmosphere for a period of time of about 5 hours. The salt mixture produced was then treated with acid such as dilute hydrochloric acid and the precipitate thus produced was the corresponding 2-hydroxymethylene-19-nor-testosterone or 17α-lower alkyl derivative thereof. By then following the procedure as set forth above, the 2α-alkyl or aralkyl-2′-formyl derivatives of 19-nor-testosterone and 19-nor-17α-lower alkyl-testosterone and the 2α-alkyl or aralkyl derivatives of 19-nor-testosterone and 19-nor-17α-lower alkyl testosterone are prepared. To form the corresponding saturated derivatives of 2α-alkyl and aralkyl-19-nor-testosterone or 19-nor-17α-lower alkyl-testosterone, the Δ⁴-3-keto compounds are treated with lithium in liquid ammonia to hydrogenate the double bond. Upon treatment of the saturated or unsaturated derivatives with sodium borohydride, the 3-keto group is converted into a 3-hydroxy group as described hereinabove.

The preparation of the novel 2β-alkyl or aralkyl derivatives of the present invention can be illustrated by the following equation:

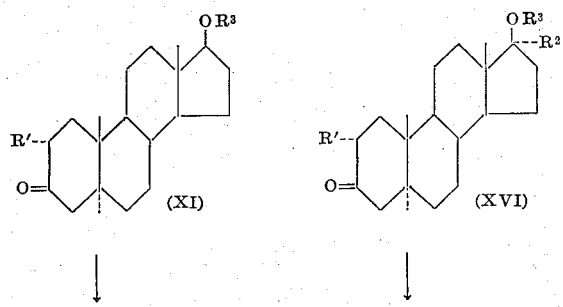

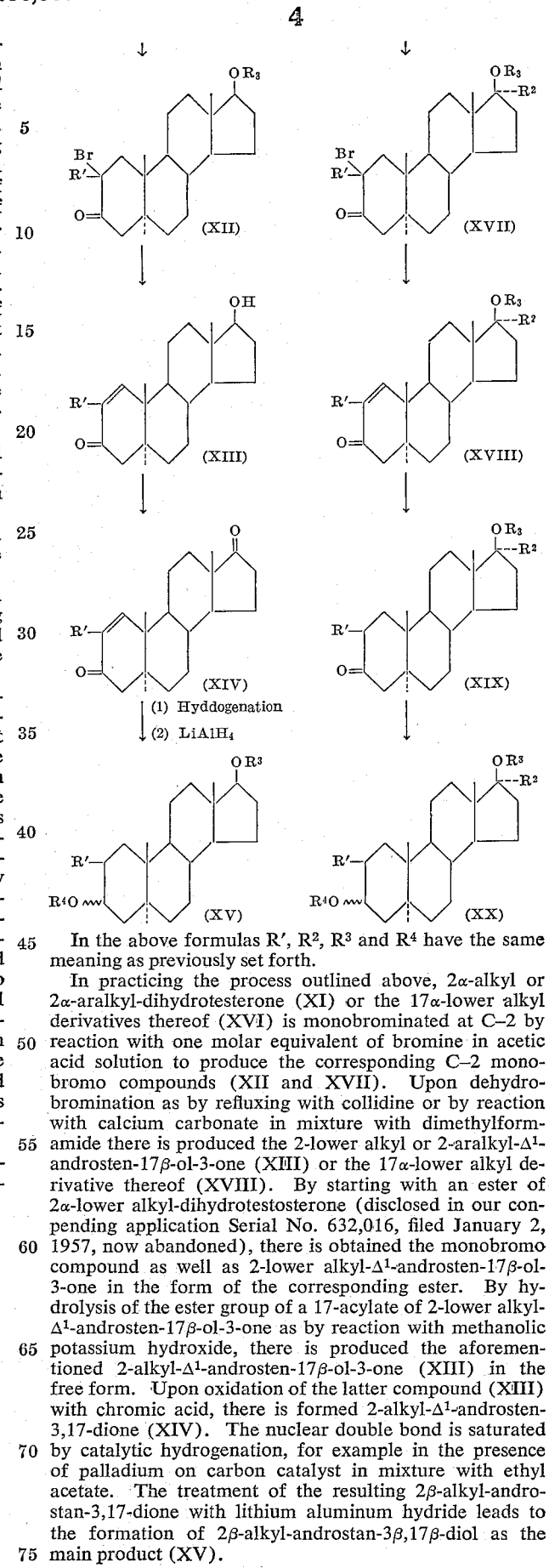

In the above formulas R′, R², R³ and R⁴ have the same meaning as previously set forth.

In practicing the process outlined above, 2α-alkyl or 2α-aralkyl-dihydrotesterone (XI) or the 17α-lower alkyl derivatives thereof (XVI) is monobrominated at C–2 by reaction with one molar equivalent of bromine in acetic acid solution to produce the corresponding C–2 monobromo compounds (XII and XVII). Upon dehydrobromination as by refluxing with collidine or by reaction with calcium carbonate in mixture with dimethylformamide there is produced the 2-lower alkyl or 2-aralkyl-Δ¹-androsten-17β-ol-3-one (XIII) or the 17α-lower alkyl derivative thereof (XVIII). By starting with an ester of 2α-lower alkyl-dihydrotestosterone (disclosed in our copending application Serial No. 632,016, filed January 2, 1957, now abandoned), there is obtained the monobromo compound as well as 2-lower alkyl-Δ¹-androsten-17β-ol-3-one in the form of the corresponding ester. By hydrolysis of the ester group of a 17-acylate of 2-lower alkyl-Δ¹-androsten-17β-ol-3-one as by reaction with methanolic potassium hydroxide, there is produced the aforementioned 2-alkyl-Δ¹-androsten-17β-ol-3-one (XIII) in the free form. Upon oxidation of the latter compound (XIII) with chromic acid, there is formed 2-alkyl-Δ¹-androsten-3,17-dione (XIV). The nuclear double bond is saturated by catalytic hydrogenation, for example in the presence of palladium on carbon catalyst in mixture with ethyl acetate. The treatment of the resulting 2β-alkyl-androstan-3,17-dione with lithium aluminum hydride leads to the formation of 2β-alkyl-androstan-3β,17β-diol as the main product (XV).

The same compound is also obtained by hydrogenation of 2-alkyl-Δ¹-androsten-17β-ol-3-one or an ester of the same to 2β-alkyl-dihydrotestosterone or its ester respectively, followed by treatment of these saturated compounds with lithium aluminum hydride.

Upon hydrogenation of 2,17α-dialkyl-Δ¹-androsten-17β-ol-3-one or the esters thereof (XVIII) there is produced the respective 2β,17α-dialkyl-dihydrotestosterone or their esters (XIX). By treatment of the latter compounds with lithium aluminum hydride there is produced as the main product the respective 2β,17α-dialkyl-androstan-3β,17β-diol or the 17-esters thereof (XX).

By conventional methods of esterification with hydrocarbon carboxylic acid anhydrides or chlorides of less than 12 carbon atoms there is formed monoesters of those compounds having a single secondary hydroxyl group at C-3 or C-17 and diesters of those compounds having a secondary hydroxyl group at both C-3 and C-17. Esterification of the tertiary hydroxyl group at C-17 is effected by reaction with the hydrocarbon carboxylic acid anhydrides in mixture with an organic solvent inert to the reaction, such as benzene, and in the presence of an acid catalyst such as p-toluenesulfonic acid. Esterification of the 3-keto compounds can be effected prior to the formation of the 3-alcohols and thus diesters having the same or different ester groups can be prepared.

The novel intermediate compounds 2-alkyl-Δ¹-androsten-17β-ol-3-one and 2β-alkyl-dihydrotestosterone, their 17-alkyl and ester derivatives (XIII, XIV, XVIII and XIX) are important and androgenic type hormones having anabolic, anti-gonadotrophic and anti-estrogenic activity in addition to their use as intermediates for the preparation of the novel compounds of the present invention:

The following examples serve to illustrate but are not intended to limit the scope of the present invention:

*Example I*

2-hydroxymethylene-17α-methyl-testosterone was prepared in accordance with the method of Weissenborn, Remy and Jacobs, J. Am. Chem. Soc., 76, 552 (1954), starting with 17α-methyl-testosterone.

2.3 g. of 2-hydroxymethylene-17α-methyl-testosterone and 170 mg. of sodium hydride suspended in 50 cc. of benzene was treated with 10 cc. of methyl iodide and the mixture was refluxed under an atmosphere of nitrogen. 10 additional cc. of methyl iodide was added after 24 hours, followed by 10 cc. more after 48 hours, and the refluxing was continued to a total of 72 hours. The cooled mixture was washed with 1% sodium hydroxide solution to remove traces of unchanged starting material and the organic layer was evaporated to dryness under reduced pressure. Crystallization of the residue from acetone-hexane afforded 2-methyl-2′-formyl-17α-methyl-Δ⁴-androsten-17β-ol-3-one.

A solution of 1 g. of the above compound in benzene was used to impregnate a column of 100 g. of alkaline activated alumina. After 24 hours the column was eluted with ethyl acetate and the eluates were crystallized from acetone-hexane to produce 2α,17α-dimethyl-testosterone; melting point 150–152° C., $[\alpha]_D$ +82° ($CHCl_3$).

A solution of 1 g. of 2α,17α-dimethyl-testosterone in 20 cc. of methanol was mixed with 100 mg. of sodium borohydride previously dissolved in 2 cc. of water and the mixture was kept standing overnight at room temperature. The solvent was removed under reduced pressure, water and a few drops of acetic acid were added to the residue and the reduction product was collected, thus giving a mixture of 2α,17α-dimethyl-Δ⁴-androstene-3α,17β-diol and 2α,17α-dimethyl-Δ⁴-androstene-3β,17β-diol. After conventional separation the last mentioned compound had a melting point of 135–144° C.

*Example II*

A mixture of 1 g. of 2α,17α-dimethyl-testosterone, 100 cc. of methanol (ethyl acetate can be used alternatively) and 100 mg. of 5% palladium on barium sulfate catalyst was hydrogenated under an atmosphere of hydrogen at atmospheric pressure and 25° C. until the equivalent of one mol of hydrogen had been absorbed. The catalyst was filtered, the filtrate was evaporated to dryness and the residue was chromatographed in a column with activated alumina. Upon elution with mixtures of benzene and ether, there came out first the fractions of 2α,17α-dimethyl-testan-17β-ol-3-one and then the fractions of 2α,17α-dimethyl-androstan-17β-ol-3-one, melting point 151–154° C. $[\alpha]_D$ +8° ($CHCl_3$).

1 g. of 2α,17α-dimethyl-androstan-17β-ol-3-one was treated with sodium borohydride in the same manner as described in Example I to thus afford a mixture of 2α,17α-dimethyl-androstane - 3α,17β - diol and 2α,17α-dimethyl-androstane-3β,17β-diol which was separated by conventional methods. The 2α,17α-dimethyl-androstane-3β,17β-diol showed anti-estrogenic activity at 50 μg. dose level when assayed in the standard anti-estrogenic assay.

*Example III*

Following the method described in Example I, except that ethyl iodide was used instead of methyl iodide, there were obtained 2α-ethyl-17α-methyl-testosterone and finally 2α - ethyl - 17α-methyl-Δ⁴-androstene-3α,17β-diol and 2α-ethyl-17α-methyl-Δ⁴-androstene-3β,17β-diol.

*Example IV*

By following the procedure described in Example II, 2α-ethyl - 17α-dimethyl-testosterone was converted into 2α-ethyl - 17α - methyl-testan-17β-ol-3-one and 2α-ethyl-17α-methyl-androstan-17β-ol-3-one.

In accordance with the method of Example I, 2α-ethyl-17α - methyl - androstan-17β-ol-3-one was treated with sodium borohydride to afford 2α-ethyl-17α-methyl-androstan - 3α,17β-diol and 2α-ethyl-17α-methyl-androstan-3β,17β-diol.

*Example V*

Following the methods described in Examples I and II except that propyl iodide was used instead of methyl iodide, there were obtained 2α-propyl-17α-methyl-Δ⁴-androsten-3β,17β-diol, 2α-propyl-17α-methyl-Δ⁴-androstene-3α,17β - diol, 2α - propyl-17α-methyl-androstane-3β,17β-diol and 2α-propyl-17α-methyl-androstane-3α,17β-diol.

*Example VI*

A mixture of 2.2 g. of 2-hydroxymethylene-17α-methyl-testosterone, 170 mg. of sodium hydride and 50 cc. of benzene was treated with 10 cc. of benzyl iodide and refluxed for 72 hours under an atmosphere of nitrogen. After cooling the mixture was washed with previously cooled 1% sodium hydroxide solution and then evaporated to dryness under reduced pressure. Crystallization from acetone-hexane gave 2 - benzyl-2′-aldehydo-17α-methyl-testosterone.

Further treatment of the compound in accordance with the methods described in Examples I and II produced 2α-benzyl - 17α - methyl-testosterone, 2α-benzyl-17α-methyl-dihydrotestosterone, 2α-benzyl-17α-methyl-Δ⁴-androstene-3α,17β - diol. 2α - benzyl-17α-methyl-Δ⁴-androstene-3β,17β-diol, 2α - benzyl-17α-methyl-androstane-3α,17β-diol, and 2α - benzyl-17α-methyl-androstane-3β,17β-diol.

*Example VII*

Following the method of Examples I and II but starting from 2 - hydroxymethylene-17α-ethyl-testosterone instead of the 17α-methyl homologue, there was obtained 2α - methyl-17α-ethyl-Δ⁴-androstene-3α,17β-diol, 2α-methyl - 17α-ethyl-Δ⁴-androstene-3β,17β-diol, 2α-methyl-17α-ethyl - androstane-3α,17β-diol and 2α-methyl-17α-ethyl-androstan-3β,17β-diol.

In accordance with the method of the preceding Example except that 2 - hydroxymethylene-17α-propyl testosterone was employed as the starting material instead of the 17α-ethyl homologue, there was obtained the corresponding 3α,17β and 3β,17β-diols having a propyl group at C–17α instead of an ethyl group.

In a similar way there was prepared the following derivatives of Δ⁴-androstene-3,17β-diol and of androstane-3,17β-diol: 2α-ethyl-17α-propyl, 2α,17α-diethyl, 2α-propyl-17α - ethyl, 2α17α-dipropyl, 2α-benzyl-17α-ethyl and 2α-benzyl-17α-propyl.

Of all the compounds described in the present example and in the previous Examples I through VII there were prepared their 3-monoacetates by reaction with acetic anhydride in pyridine solution at the temperature of the steam bath as well as other esters such as the propionates, benzoates and cyclopentylpropionates.

Example IX

A solution of 5 g. of 2α-methyl-dihydrotestosterone in 250 cc. of methanol was mixed with a solution of 3 g. of sodium borohydride in 40 cc. of water and refluxed for 1 hour and cooled. The excess of hydride was decomposed by slowly adding acetic acid, the mixture was concentrated under reduced pressure and then diluted with water. The precipitate was collected, washed with water and air dried. The product consisted of a mixture of the 3α and 3β-isomers of 2α-methyl-androstane-3,17β-diol, which were separated by chromatography on neutral alumina. In the androgen-anabolic assay, 2α-methyl-androstane-3α,17β-diol exhibited about half the activity of testosterone and about 0.2 androgenic activity of testosterone when the compound was given by injection. Thus the androgen-anabolic ratio of 2α-methyl-androstane-3α,17β-diol is 2.5 (the androgenanabolic ratio of testosterone is 1). In the anti-estrogenic assay by injection, 2α-methyl-androstane-3α,17β-diol was active at 100 μg. total dose and 2α-methyl androstane-3β,17β-diol was active at 300 μg. total dose level. Androstane-3β,17β-diol was found to be inactive at a total dose level of 8000 μg.

Example X

In another experiment 2α-methyl-dihydrotestosterone was treated with sodium borohydride in mixture with aqueous methanol at room temperature for 4 hours and the product was isolated as described in the previous example; the final result was the same.

Example XI

To a solution of 5 g. of 2α-methyl-dihydrotestosterone 17-acetate in 200 cc. of tetrahydrofuran, there was added a solution of 1 g. of sodium borohydride in 40 cc. of water and the mixture was stirred at room temperature for 4 hours. The product was isolated by following the procedure of Example IX, thus giving a mixture of the 17-acetates of 2α-methyl-androstane-3α,17β-diol and 2α-methyl-androstan-3β,17β-diol; the isomers were separated by chromatography on neutral alumina.

In other experiments htis method was applied to other 17-esters of 2α-methyl-dihydrotestosterone, to produce the respective 17-esters of the 3α and 3β-isomers of 2α-methyl-androstan-3,17β-diol.

Example XII

A mixture of 2 g. of 2α-methyl-androstan-3β,17β-diol, 20 cc. of pyridine and 1 cc. of acetic anyhdride was kept overnight at room temperature, then heated on the steam bath for half an hour and diluted with water; the precipitate was collected by filtration and purified by chromatography on neutral alumina, thus yielding 2α-methyl-androstan-3β,17β-diol 3,17-diacetate.

Example XIII

By following the procedure of the previous example, there was acetylated 17β-propionoxy-2α-methyl-androstan-3β-ol to 2α-methyl-androstan-3β,17β-diol-3-acetate-17-propionate.

Example XIV

By following the method of Example XII and by reaction with the anhydride of any carboxylic acid of up to 12 carbon atoms, the respective 3,17β-androstane-diols or their 17-esters were converted into the corresponding diesters of the 3α and 3β-isomers of 2α-methyl-androstan-3,17β-diol, with the same or different radicals.

Example XV

A solution of 2 g. of 2α-methyl-dihydrotestosterone 17-acetate in 120 cc. of glacial acetic acid was mixed with a few drops of a 4 N solution of hydrogen bromide in acetic acid and then treated dropwise, under continuous stirring, with a solution of 1.05 molar equivalents of bromine in acetic acid. When the mixture had decolorized completely it was diluted with water and the precipitate was collected, washed with water and air dried. There was thus obtained the crude 2-methyl-2-bromo-dihydrotestosterone 17-acetate, which was used for the next step without further purification. In another experiment, 2-methyl-2-bromo-dihydrotestosterone 17-acetate was purified by recrystallization from chloroform-methanol.

The above crude 2-methyl-2-bromo-dihydrotestosterone acetate was mixed with 14 cc. of γ-collidine and refluxed for 45 minutes; the cooled mixture was diluted with ether, the precipitate of collidine hydrobromide was filtered and washed with ether and the filtrate and washings were combined. The solution was then consecutively washed with dilute hydrochloric acid, water, aqueous sodium bicarbonate solution and water, dried over anhydrous sodium sulfate and the solvent was evaporated. Crystallization of the residue from acetone-hexane furnished 2-methyl-Δ¹-androsten-17β-ol-3-one 17-acetate.

A mixture of 1.5 g. of the above compound and 150 cc. of methanol containing 1 g. of potassium hydroxide was kept for 2 hours at a temperature around 35° C., then acidified with acetic acid, concentrated to a small volume and diluted with water; the precipitate was collected, dried and recrystallized from acetone-hexane. There was thus obtained the free 2-methyl-Δ¹-androsten-17β-ol-3-one.

A solution of 1.2 g. of the above compound in 25 ml. glacial acetic acid was treated little by little with 1.1 molar equivalents of chromium trioxide, in 4 ml. of 80% acetic acid, maintaining the temperature below 20° C. The mixture was then kept for 2 hours at room temperature and diluted with water; the precipitate was collected by filtration, washed with water, dried and recrystallized from acetone-hexane; there was obtained 2-methyl-Δ¹-androsten-3,17-dione.

1 g. of the above compound was hydrogenated in mixture with a suspension of 200 mg. of prereduced 5% palladium on carbon catalyst in 100 cc. of ethyl acetate; when the equivalent of 1 mol of hydrogen had been absorbed the catalyst was removed by filtration and the ethyl acetate solution was evaporated to dryness. The residue crystallized from acetone-hexane to furnish 2β-methyl-androstane-3,17-dione.

A solution of 1 g. of 2β-methyl-androstane-3,17-dione in 50 cc. of anhydrous tetrahydrofuran was slowly added to a stirred suspension of 500 mg. of lithium aluminum hydride in 50 cc. of dry ether, with cooling. The mixture was then refluxed for 1 hour, cooled, the excess of hydride was decomposed by the addition of a few drops of ethyl acetate and saturated sodium sulfate solution was added, followed by anhydrous sodium sulfate. The solids were removed by filtration and the solution was evaporated to dryness. There was thus obtained a mixture of the 3α and 3β-isomers of 2β-methyl-androstan-3,17β diol, where the β-isomer predominated and which was isolated by chromatography.

Example XVI

Instead of the ester, the free 2α-methyl-dihydrotestosterone was subjected to the treatment described in the previous example; there was thus obtained 2-methyl-2-bromo-dihydrotestosterone and then 2-methyl-$\Delta^1$-androsten-17$\beta$-ol-3-one and finally 2$\beta$-methyl-androstane-3$\beta$,17$\beta$-diol identical with the one obtained in accordance with such example.

Example XVII 2-methyl-$\Delta^1$-androsten-17$\beta$-ol-3-one 17-acetate was hydrogenated to 2$\beta$-methyl-dihydrotestosterone acetate, and in another experiment the free 2-methyl-$\Delta^1$-androsten-17$\beta$-ol-3-one was converted into 2$\beta$-methyl-dihydrotestosterone; upon subsequent reaction with lithium aluminum hydride, both compounds were converted into 2$\beta$-methyl-androstane-3$\beta$,17$\beta$-diol, since the reduction is accompanied by hydrolysis of the ester group present. The procedure described in Example IX was followed for these operations.

Example XVIII

By following the method of Example XV, 2$\alpha$,17$\alpha$-dimethyl-dihydrotestosterone was monobrominated to 2$\alpha$,17$\alpha$-dimethyl-2-bromo-dihydrotestosterone and the latter was dehydrobrominated to 2,17$\alpha$-dimethyl-$\Delta^1$-androsten-17$\beta$-ol-3-one, which was then hydrogenated to produce 2$\beta$,17$\alpha$-dimethyl - dihydrotestosterone; upon subsequent treatment with lithium aluminum hydride there was obtained 2$\beta$,17$\alpha$-dimethyl-androstane-3$\beta$,17$\beta$-diol.

Example XIX

A mixture of 5 g. of 2,17$\alpha$-dimethyl-$\Delta^1$-androsten-17$\beta$-ol-3-one described in the previous example, 500 cc. of anhydrous benzene, 10 cc. of acetic anhydride and 1 g. of p-toluenesulfonic acid was stirred for 24 hours at a temperature between 20 and 25° C. The mixture was diluted with water, the benzene layer was separated and washed with aqueous sodium bicarbonate solution and water, dried over anhydrous sodium sulfate and the benzene was evaporated. Crystallization of the residue from acetone-hexane yielded 2,7$\alpha$-dimethyl-$\Delta^1$-androsten-17$\beta$-ol-3-one 17-acetate. The latter was hydrogenated to 2$\beta$,17$\beta$-dimethyl-dihydrotestosterone 17-acetate in accordance with the procedure described in Example XV. Upon subsequent treatment with lithium aluminum hydride, as described in such example, there was obtained, with simultaneous hydrolysis of the acetoxy group, 2$\beta$,17$\alpha$-dimethyl-androstan-3$\beta$,17$\beta$-diol as the main product, which was identical to the final compound of the previous example.

In other experiments, the esterification of 2,17$\alpha$-dimethyl-$\Delta^1$-androsten-17$\beta$-ol-3-one was conducted with other hydrocarbon carboxylic acid anhydrides of up to 12 carbons, different from acetic anhydride, to produce the corresponding 17-esters including the benzoate and cyclopentylpropionate, and then the corresponding 17-esters of 2$\beta$,17$\alpha$-dimethyl-dehydrotestosterone; in the subsequent treatment with lithium aluminum hydride, there were simultaneously hydrolyzed the ester groups, with formation of 2$\beta$,17$\alpha$-dimethyl-androstan-3$\beta$,17$\beta$-diol, identical with the one mentioned above.

Example XX

In the step of dehydrobromination of Examples XV, XVI, and XVIII, the reaction with collidine was substituted for a reaction with calcium carbonate in mixture with dimethylformamide, with the same results.

For example, a solution of 2 g. of 2-methyl-2-bromo-dihydrotestosterone 17-acetate in 50 cc. of dimethylformamide was mixed with 5 g. of calcium carbonate and the mixture was stirred for 1 hour at 90° C.; the solution was filtered while hot, washing the filter with a little hot dimethylformamide, and the combined filtrate and washings was cooled, diluted with water and the precipitate of the crude 2-methyl-$\Delta^1$-androsten-17$\beta$-ol-3-one 17-acetate was collected by filtration. By recrystallization from acetone-hexane there was obtained the pure compound having identical properties to those of the compound obtained in accordance with Example XV which was then converted into 2$\beta$-methyl-androstane-3$\beta$,17$\beta$-diol as described in such example.

Example XXI

By essentially following the procedure described by A. Behal, A. Ch., 20, 417 (1900), there was prepared the mixed anhydride of formic and acetic acids, by reaction of acetic anhydride with anhydrous formic acid.

A mixture of 1 g. of 2$\alpha$,17$\alpha$-dimethyl-androstan-17$\beta$-ol-3-one, 2 g. of such anhydride and 20 cc. of pyridine was heated at 90° C. for 48 hours, cooled, poured into water and extracted with ethyl acetate; the extract was washed with dilute hydrochloric acid, then with 5% aqueous sodium bicarbonate solution and finally with water to neutral, dried over anhydrous sodium sulfate and the solvent was evaporated; recrystallization of the residue from aqueous methanol afforded the 17-formate of 2$\alpha$,17$\alpha$-dimethyl-androstan-17$\beta$-ol-3-one, namely the 17-formate of 2$\alpha$,17$\alpha$-dimethyl-dihydrotestosterone.

By starting with 2$\alpha$,17$\alpha$-dimethyl-testosterone instead of 2$\alpha$,17$\alpha$-dimethyl-androstan-17$\beta$-ol-3-one, there was produced the formate of 2$\alpha$,17$\alpha$-dimethyl-testosterone.

Example XXII

Following the method described in Example XXI, but starting from 2$a$-methyl-17$\alpha$-ethyl dihydrotestosterone, there was obtained the 17-formate of 2$\alpha$-methyl-17$\alpha$-ethyl-dihydrotestosterone.

Example XXIII

Following the method described in Example XXI, except that the mixed anhydride of formic and acetic acids was replaced by acetic anhydride, there was obtained the 17-acetate of 2$\alpha$,17$\alpha$-dimethyl-dihydrotestosterone and the 17-acetate of 2$\alpha$,17$\alpha$-dimethyl-testosterone.

Example XXIV

A solution of 1 g. of 2$\alpha$,17$\alpha$-dimethyl-dihydrotestosterone in 20 cc. of pyridine was treated with 4 g. of cyclopentylpropionic anhydride and heated at 90° C. for 4 days, cooled, poured into ice water and extracted with methylene chloride; the extract was successively washed with dilute hydrochloric acid, 5% aqueous sodium bicarbonate solution and water, dried over anhydrous sodium sulfate and the solvent was evaporated; chromatography of the residue on neutral alumina furnished the 17-cyclopentylpropionate of 2$\alpha$,17$\alpha$-dimethyldihydrotestosterone.

Example XXV

Following the method of Example XXIII, except that cyclopentylpropionic anhydride is replaced by caproic anhydride there was obtained the 17-caproate of 2$\alpha$,17$\alpha$-dimethyldihydrotestosterone.

Example XXVI

Following the method of Example XXI, 1 g. of 2$\alpha$,17$\alpha$-diethyldihydrotestosterone was treated with 2 g. of propionic anhydride to produce the 17-propionate of 2$\alpha$,17$\alpha$-diethyl-dihydrotestosterone.

Example XXVII

A mixture of 1 g. of 2$\alpha$,17$\alpha$-dimethyl-dihydrotestosterone, 50 cc. of acetic acid, 10 cc. of acetic anhydride and 1 g. of p-toluenesulfonic acid monohydrate was kept overnight at room temperature, poured into water, heated for half an hour on the steam bath, cooled and the precipitate was collected; it was then washed with 5% aqueous sodium bicarbonate solution and water, dried and recrystallized from methylene chloride-methanol, thus yielding the 17-acetate of 2$\alpha$,17$\alpha$-dimethyl-dihydrotestosterone.

Example XXVIII

A solution of 1 g. of 2$\alpha$,17$\alpha$-dimethyl-dihydrotestosterone in 50 cc. of benzene was treated with 2 g. of caproic anhydride and 500 mg. of p-toluenesulfonic acid monohydrate and kept at room temperature for 3 days; after pouring into water the benzene layer was separated, washed with aqueous sodium bicarbonate solution and water and the solvent was evaporated. Recrystallization of the residue from acetone-hexane afforded the caproate of 2α,17α-dimethyldihydrotestosterone, identical with that obtained in Example XXV.

*Example XXIX*

In accordance with the method of Example XI, the esters produced in Examples XXI through XXVI were treated with sodium borohydride to produce the corresponding C-17-monoesters of the respective 2α,17α-dialkyl-androstane-3α,17β-diols and 2α,17α-dialkyl-androstane-3β,17β-diols, and of the corresponding Δ⁴-compounds.

Upon further esterification with acetic anhydride as described in Example VIII there were produced the diesters of the respective 2α,17α-dialkyl-androstane-3,17β-diols and 2α,17α-dialkyl-Δ⁴-androstene-3,17β-diols. Thus there were produced the 3-acetate-17-formate of 2α,17α-dimethyl-androstane-3,17β-diol, of 2α,17α-dimethyl-Δ⁴-androstene-3,17β-diol and of 2α-methyl-17α-ethyl-androstane-3,17β-diol; the diacetate of 2α,17α-dimethyl-androstane-3,17β-diol and of 2α,17α-dimethyl-Δ⁴-androstene-3,17β-diol; the 3-acetate-17-cyclopentylpropionate of 2α,17α-dimethyl-androstane-3,17β-diol; the 3-acetate-17-caproate of 2α,17α-dimethyl-androstane-3,17β-diol and of 2α,17α-dimethyl-Δ⁴-androstene-3,17β-diol; and the 3-acetate-17-propionate of 2α,17α-diethyl-androstane-3,17β-diol.

By substituting the acetic acid anhydride by propionic acid anhydride or benzoic acid anhydride there were produced the above diesters having the propionoxy or benzoyloxy moiety at C-3 instead of the acetoxy moiety.

*Example XXX*

A solution of 10 g. of 19-nor-testosterone in 500 cc. of thiophene free benzene was mixed under nitrogen with 10 cc. of ethyl formate, followed by the addition in small portions of 3 g. of sodium hydride. The mixture was stirred for 5 hours and the resulting mixture of salts was collected by filtration, washed several times with benzene and dried. This mixture was added little by little to a stirred dilute hydrochloric acid solution which caused the formation of a precipitate. The stirring was continued for 30 minutes and the precipitate was collected, washed with distilled water and dried in vacuo. There was thus obtained 2-hydroxymethylene-19-nor-testosterone which was used for the next stage without further purification.

The 2-hydroxymethylene-19-nor-testosterone was added to a suspension of 700 mg. of sodium hydride in 200 cc. of benzene, mixed with 40 cc. of methyl iodide and the mixture was refluxed under an atmosphere of nitrogen. After 24 hours an additional 40 cc. of methyl iodide was added followed by another 40 cc. after 24 hours further, and the refluxing was continued for still 24 hours more. The cooled mixture was washed with 1% sodium hydroxide solution and the organic layer was evaporated to dryness under reduced pressure. Crystallization of the residue from acetone-hexane yielded 2-methyl-2-aldehydo-19-nor-Δ⁴-androsten-17β-ol-3-one.

This 2-methyl-2-aldehydo compound was dissolved in benzene and transferred to a column with 800 g. of activated alumina. After 24 hours the column was eluted with ethyl acetate and the eluates crystallized from acetone-hexane to produce 2α-methyl-19-nor-testosterone.

By essentially analogous methods, but using ethyl iodide instead of methyl iodide, there was prepared 2α-ethyl-19-nor-testosterone; there were also obtained, from the corresponding 17α-alkyl derivatives of 19-nor-testosterone, 2α,17α-dimethyl-19-nor-tetrosterone, 2α-methyl-17α-ethyl-19-nor-testosterone, 2α-ethyl-17α-methyl-19-nor-testosterone and 2α,17α-diethyl-19-nor-testosterone respectively.

*Example XXXI*

A solution of 1 g. of 2α-methyl-19-nor-testosterone, obtained in accordance with the previous example, in a mixture of 10 cc. of dioxane and 10 cc. of absolute ether was added dropwise, under continuous stirring to a blue solution of 250 mg. of lithium metal in liquid ammonia. When the addition of the steroid was complete the solution had decolorized and then a small amount of lithium was added until the blue color persisted. 1.5 g. of solid ammonium chloride was added, the ammonia was allowed to evaporate, the residue was treated with water and chloroform and the organic layer was washed with dilute hydrochloric acid, sodium carbonate solution and water. The solvent was removed by distillation and the residue was dissolved in a mixture benzene-hexane and chromatographed in a column of neutral washed alumina. There was thus obtained 2α-methyl-19-nor-androstan-17β-ol-3-one in pure form.

Similarly, the double bond of the other 19-nor testosterones obtained in accordance with the previous example was reduced to produce: 2α-ethyl-19-nor-androstan-17β-ol-3-one, 2α,17α-dimethyl-19-nor-androstan-17β-ol-3-one, 2α-ethyl-17α-methyl-19-nor-androstan-17β-ol-3 - one and 2α,17α-diethyl-19-nor-androstan-17β-ol-3-one.

*Example XXXII*

A solution of 1 g. of 2α-methyl-19-nor-androstan-17β-ol-3-one in 50 cc. of methanol was mixed with a solution of 200 mg. of sodium borohydride in 5 cc. of water and the mixture was kept standing for 16 hours. After pouring into ice-cold sodium chloride solution the excess of hydride was decomposed by the addition of a few drops of acetic acid. The precipitate was filtered, dried and dissolved in a mixture hexane-benzene. This solution was chromatographed in a column of neutral washed alumina, thus producing the 3α and 3β isomers of 2α-methyl-19-nor-androstane-3,17β-diol where the 3β isomer predominated.

*Example XXXIII*

In accordance with the method of the preceding example, 2α-methyl-19-nor-testosterone, 2α-ethyl-19-nor-testosterone, 2α,17α-dimethyl - 19 - nor - testosterone, 2α-methyl-17α-ethyl-19-nor-testosterone, 2α-ethyl-17α-methyl-19-nor-testosterone and 2α,17α-diethyl-19-nor-testosterone were transformed into the 3α and 3β-isomers of 2α-methyl-19-nor-Δ⁴-androstene-3,17β-diol, 2α - ethyl - 19-nor-Δ⁴-androstene-3,17β-diol, 2α,17α-dimethyl-19-nor-Δ⁴-androstene - 3β,17β - diol, 2α-methyl-17α-ethyl-19-nor-Δ⁴-androstene - 3β,17β - diol, 2α-ethyl-17α-methyl-19-nor-Δ⁴-androstene - 3,17β - diol, and 2α,17α-diethyl-19-nor-Δ⁴-androstene-3,17β-diol.

*Example XXXIV*

By applying the method of Example XXXII to 2α-ethyl-19-nor-androstan-17β-ol-3-one, 2α,17α-dimethyl-19-nor-androstan-17β-ol-3-one, 2α-ethyl-17α-methyl-19-nor-androstan-17β-ol-3-one, and 2α,17α-diethyl-19-nor-androstan-17β-ol-3-one (cf. Example XXXI), there were produced the 3α and 3β isomers of 2α-ethyl-19-nor-androstane - 3,17β - diol, 2α,17α-dimethyl-19-nor-androstane-3,17β-diol, 2α-ethyl-17α-methyl-19-nor - androstane - 3,17β-diol and 2α,17α-diethyl-19-nor-androstane-3,17β-diol.

*Example XXXV*

By substituting in the method of Example I the 2α,17α-dimethyl-testosterone by 2α-methyl-testosterone, disclosed in our copending application Serial No. 632,016, filed January 2, 1957, there were obtained the 3α and 3β isomers of 2α-methyl-Δ⁴-androstene-3,17β-diol.

Similarly 2α-ethyl-testosterone, 2α-propyl-testosterone and 2α-benzyl-testosterone (disclosed in our aforesaid copending application) gave the corresponding 3α and 3β isomers of 2α-ethyl-Δ⁴-androstene-3,17β-diol, 2α-propyl- $\Delta^4$-androstene-3,17$\beta$-diol and 2$\alpha$-benzyl-$\Delta^4$-androstene-3,17$\beta$-diol by the above described procedure.

*Example XXXVI*

By substituting the acetate of the 2$\alpha$-alkyl testosterones described in the preceding example and following the method of Example XI, there were obtained the 3$\alpha$ and 3$\beta$ isomers of the 17-acetates of 2$\alpha$-methyl-$\Delta^4$-androstene-3,17$\beta$-diol, 2$\alpha$-ethyl-$\Delta^4$-androstene-3,17$\beta$-diol and of 2$\alpha$-propyl-$\Delta^4$-androstene-3,17$\beta$-diol.

Similarly 2$\alpha$-benzyl-testosterone acetate afforded 2$\alpha$-benzyl-$\Delta^4$-androstene-3$\beta$,17$\beta$-diol-17-acetate and 2$\alpha$-benzyl-$\Delta^4$-androstene-3$\alpha$,17$\beta$-diol-17-acetate.

Other esters such as the propionate, cyclopentylpropionate, phenylpropionate and benzoate, disclosed in our copending application Serial No. 632,016 gave the corresponding esters of the 2$\alpha$-alkyl-$\Delta^4$-androstene-3,17$\beta$-diols and of the 2$\alpha$-benzyl-$\Delta^4$-androstene-3,17$\beta$-diols.

Upon further esterification with carboxylic acid anhydrides of less than 12 carbon atoms as described in Example XXIX, there were produced the diesters of the respective 2$\alpha$-alkyl-$\Delta^4$-androstene-3,17$\beta$-diol-17 - acylates and of 2$\alpha$-benzyl-$\Delta^4$-androstene-3,17$\beta$-diol-17-acylates.

We claim:
1. 2$\alpha$,17$\alpha$-di-lower alkyl-19-nor-androstane-3,17$\beta$-diol.
2. 2$\alpha$,17$\alpha$-dimethyl-19-nor-androstane-3,17$\beta$-diol.
3. The 3-hydrocarbon carboxylic acid esters of less than 12 carbon atoms of 2$\alpha$,17$\alpha$-di-lower alkyl-19-nor-androstane-3,17$\beta$-diol.
4. 2-methyl-$\Delta^1$-androsten-17$\beta$-ol-3-one.
5. The hydrocarbon carboxylic acid esters of less than 12 carbon atoms of 2-methyl-$\Delta^1$-androsten-17$\beta$-ol-3-one.
6. 2-methyl-17$\alpha$-lower alkyl-$\Delta^1$-androsten-17$\beta$-ol-3-one.
7. The hydrocarbon carboxylic acid esters of less than 12 carbon atoms of 2-methyl-17$\alpha$-lower alkyl-$\Delta^1$-androsten-17$\beta$-ol-3-one.

References Cited by the Examiner
UNITED STATES PATENTS
2,843,608   7/1958   Colton _____ 260—397.5

OTHER REFERENCES

Bernstein et al.: J. Org. Chem. 22, pp. 472–3 (1957).
Butenandt: Ber. 73, p. 206 (1940).
Djerassi: "J. Org. Chem.," vol. 12 (1947), pages 823–30.
Elisberg et al.: J.A.C.S. 74, pp. 2814–16 (1952).
Ercoli et al.: Chem. Abs. 49, col. 14046(c) (1955).
Fieser et al.: "Natural Products Related to Phenanthrene," 3rd ed., 1949, pages 375 and 377 relied on.
Hartman: J.A.C.S. 77, pp. 5151–54 (1955).
Hogg et al.: J.A.C.S. 77, pp. 6401–2 (1955).
Ruzicka et al.: Chem. Abs. 41, col. 5540d (1947).
Ruzicka et al.: Helv. Chim. Acta. 30, pp. 867–78 (1947).
Sondheimer et al.: Chem. Abs. 48, col. 699h (1954).

LEWIS GOTTS, *Primary Examiner.*

L. H. GASTON, MORRIS LIEBMAN, *Examiners.*